United States Patent
Pandey et al.

(10) Patent No.: US 7,337,054 B2
(45) Date of Patent: Feb. 26, 2008

(54) SYSTEMS AND METHODS FOR CONTROLLING SLIP

(75) Inventors: Saurabh Pandey, Dunlap, IL (US); Michael A. Caruthers, Washington, IL (US); Richard J. Skiba, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 733 days.

(21) Appl. No.: 10/901,349

(22) Filed: Jul. 29, 2004

(65) Prior Publication Data

US 2006/0025917 A1  Feb. 2, 2006

(51) Int. Cl.
*G06F 7/00* (2006.01)

(52) U.S. Cl. .............................. 701/82; 701/50; 701/90

(58) Field of Classification Search .................. 701/50, 701/82, 90; 180/197; 477/174–176
See application file for complete search history.

(56) References Cited

U.S. PATENT DOCUMENTS

| | | | |
|---|---|---|---|
| 4,986,377 A | 1/1991 | Moriarty | |
| 5,190,111 A | 3/1993 | Young et al. | |
| 5,287,280 A | 2/1994 | Yamamoto et al. | |
| 5,333,479 A | 8/1994 | Yamamoto et al. | |
| 5,699,248 A | 12/1997 | Nakagami et al. | |
| 5,755,291 A | 5/1998 | Orbach et al. | |
| 5,911,769 A | 6/1999 | Orbach et al. | |
| 6,024,183 A | 2/2000 | Dietz et al. | |
| 6,039,141 A * | 3/2000 | Denny | 180/329 |
| 6,144,910 A * | 11/2000 | Scarlett et al. | 701/50 |
| 6,199,786 B1 * | 3/2001 | Lessard et al. | 172/7 |
| 6,317,676 B1 | 11/2001 | Gengler et al. | |

* cited by examiner

*Primary Examiner*—Yonel Beaulieu
(74) *Attorney, Agent, or Firm*—Finnegan, Henderson, Farabow, Garrett & Dunner

(57) ABSTRACT

A system is provided for controlling slip of a ground-engaging traction device of a work machine. The system includes an actual slip calculator operable to transmit an actual slip signal corresponding to an actual slip experienced by the work machine. The system also includes a ground condition selector operable to transmit a ground condition signal corresponding to a selected ground condition. A desired slip calculator is operable to transmit a desired slip signal based on the ground condition signal. A slip controller is coupled with the actual slip calculator and the desired slip calculator. The slip controller is operable to transmit a slip control signal based on the actual slip signal and the desired slip signal. The slip control signal controls the actual slip experienced by the work machine to achieve the desired slip.

30 Claims, 3 Drawing Sheets

SYSTEMS AND METHODS FOR CONTROLLING SLIP

TECHNICAL FIELD

The present disclosure relates generally to controlling the operating parameters of a self-propelled work machine and, more particularly, to optimizing the wheel or track slip of a self-propelled work machine having an electric drive.

BACKGROUND

Self-propelled work machines, such as trucks, wheeled tractors, track type tractors and other construction vehicles, are used for a variety of tasks. These machines must be able to work efficiently over a variety of ground conditions, such as subsoil and tilled and untilled earth. In a work machine, one measure of operating efficiency, termed the "tractive efficiency," is defined as the ratio of the drawbar power (i.e., the power available to push or pull things with the tractor) to the power of the machine's motor. The drawbar power is a function of the drawbar force, which is, in turn, dependent upon the difference between the wheel or track speed, i.e., the theoretical speed ($V_t$) of the work machine, and the actual speed ($V_{act}$) of the machine over the ground. This difference is termed "slip," as it is due to the wheels or tracks slipping along the ground surface.

A condition in which no net drawbar force is generated may correspond to a condition with zero slip ($V_{act}=V_t$). If the machine is operating with zero slip, then all of the motor power is being used to overcome ground friction and to maintain current machine speed. Consequently, no net drawbar force is generated. A certain amount of slip accompanies the generation of drawbar force, and the amount of slip increases as drawbar force increases. However, the relationship between drawbar force and slip is not linear. As drawbar force is increased, each successive unit increase in drawbar force is accompanied by a progressively larger increase in slip. Ultimately, a maximum drawbar force is obtained. At this limit, further attempts to increase drawbar force result only in additional slip and no increase in drawbar force. This additional slip results in unnecessary fuel consumption and wear on the machine. Thus, controlling slip may be desired in order to operate a work machine efficiently.

Prior art systems for controlling slip in tractors including conventional propulsion systems have been developed. One such system is described in U.S. Pat. No. 5,287,280, entitled "Method and Apparatus for Controlling Shoe Slip of Crawler Vehicle." In this system, a shoe slip ratio is calculated from the difference between the traveling speed of the vehicle and the traveling speed of its tracks. When the shoe slip ratio exceeds a preset value, the power output of an internal combustion engine is cut off by a fuel injection governor. However, this technique of power control is not applicable to machines having electric drive propulsion systems. Further, the system disclosed in the '280 patent is not adjustable to optimize slip for different ground conditions or to allow an operator to select a desired tractive efficiency for current operations.

The presently disclosed slip control system is directed to solving one or more of these shortcomings of the prior art slip control systems.

SUMMARY OF THE INVENTION

A system is provided for controlling slip of a ground-engaging traction device of a work machine. The system includes an actual slip calculator operable to transmit an actual slip signal corresponding to an actual slip experienced by the work machine. The system also includes a ground condition selector operable to transmit a ground condition signal corresponding to a selected ground condition. A desired slip calculator is operable to transmit a desired slip signal based on the ground condition signal. A slip controller is coupled with the actual slip calculator and the desired slip calculator. The slip controller is operable to transmit a slip control signal based on the actual slip signal and the desired slip signal. The slip control signal controls the actual slip experienced by the work machine to achieve the desired slip.

In another aspect, a method is provided for controlling slip of a ground-engaging traction device of a work machine. An actual slip experienced by the work machine is determined. A tractive efficiency signal corresponding to a selected tractive efficiency is received. A desired slip is determined based on the ground condition signal and/or tractive efficiency signal. The actual slip experienced by the work machine is controlled to achieve the desired slip.

In another aspect, a work machine is provided. The work machine includes an electric drive propulsion system. An actual slip calculator is operable to transmit an actual slip signal corresponding to an actual slip experienced by the work machine. A desired slip calculator is operable to transmit a desired slip signal based on at least one operational input parameter. A slip controller is coupled with the actual slip calculator and the desired slip calculator. The slip controller is operable to transmit a slip control signal based on the actual slip signal and the desired slip signal. A torque output of the electric drive propulsion system is varied based upon the slip control signal to control the actual slip experienced by the work machine to achieve the desired slip.

DETAILED DESCRIPTION

The tractive efficiency (TE) of a self-propelled work machine, such as a tractor, is given by:

$$TE = P_D/P_M \quad (1),$$

where $P_D$ is the power available at the drawbar, or hitch, of the machine 20 and $P_M$ is the power expended by the propulsion system in propelling the machine. Drawbar power $P_D$ is, in turn, the product of the force (or pull) available at the drawbar ($F_D$) and the actual speed of the machine 20 over the ground ($V_{act}$). Thus:

$$TE = F_D \times V_{act}/P_M \quad (2).$$

Drawbar force $F_D$, and thus the tractive efficiency TE, are dependent upon the difference between the theoretical speed of the work machine and the actual speed of the machine over the ground. This difference is termed "slip" (S) as it is due to the wheels or tracks slipping along the ground surface. Slip S may be expressed as the normalized ratio of the actual machine speed over the ground $V_{act}$ to the theoretical speed $V_t$:

$$S = 1 - V_{act}/V_t \qquad (3).$$

Figure 1:
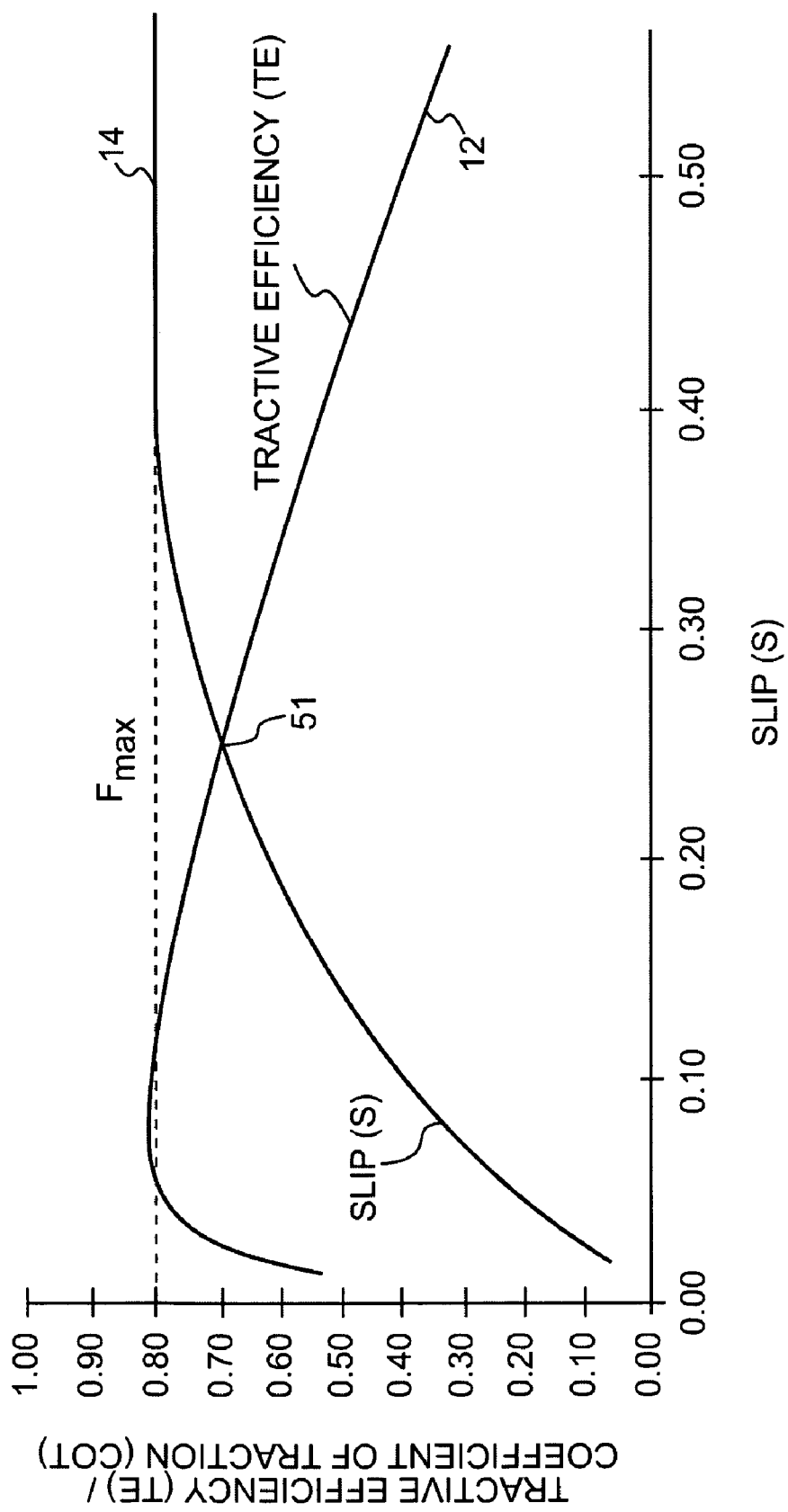
FIG. 1 is a graph that illustrates the relationship between slip, tractive efficiency and drawbar force for an exemplary work machine.

FIG. 1 illustrates the relationship between slip S, tractive efficiency TE and coefficient of traction (COT) for an exemplary work machine operating on subsoil. The coefficient of traction COT is an expression of drawbar force $F_D$ as a fraction of the machine's weight (W):

$$COT = F_D/W \qquad (4).$$

Exemplary tractive efficiency curve 12 illustrates the relationship between tractive efficiency (y-axis) and slip (x-axis). Exemplary slip curve 14 illustrates the relationship between coefficient of traction (y-axis) and slip (x-axis). The tractive efficiency curve 12 and slip curve 14 may vary based upon the configuration of the tractor (type of tread, weight distribution, etc.) and the ground conditions in which the tractor is currently operating (subsoil, tilled earth, untilled earth, etc.).

As shown in FIG. 1, no net drawbar force is generated (COT=0) at zero slip. Instead, all of the motor power is used in overcoming ground friction and maintaining current tractor speed. The drawbar force increases as slip S increases until the tractor achieves the maximum drawbar force that it can generate ($F_{max}$). As a practical matter, the maximum drawbar force a tractor can generate is limited to approximately eighty percent of the machine's weight (COT=0.8). As this limit is approached, any additional slip simply consumes fuel and wears on the machine without accomplishing useful work.

Figure 2:
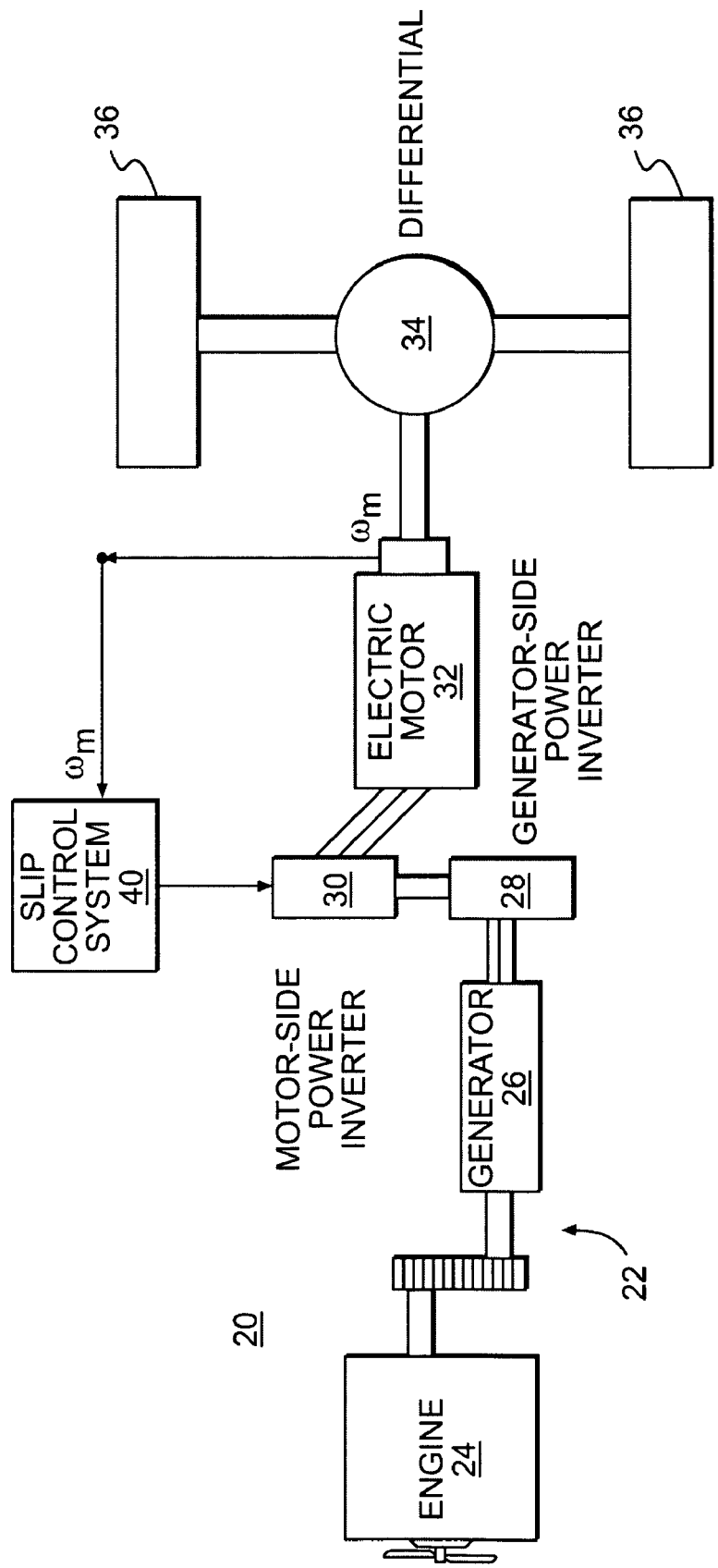
FIG. 2 is schematic representation of a self-propelled work machine having an electric drive propulsion system according to one exemplary embodiment.

FIG. 2 illustrates a self-propelled work machine 20, such as a tractor, having a slip control system 40 in accordance with an exemplary embodiment of the present disclosure. Slip control system 40 may control the slip S experienced by the machine 20 to provide a desired tractive efficiency under the current ground conditions.

In the illustrated embodiment, the self-propelled work machine 20 has an electric drive propulsion system 22. However, the present disclosure is equally applicable to self-propelled work machines having conventional propulsion systems, such as a conventional internal combustion engine.

As illustrated in FIG. 2, electric drive system 22 may include an internal combustion engine 24 coupled to provide power to an electric generator 26. Generator 26 converts the mechanical power of engine 24 into alternating current having a frequency related to the engine rotational speed. In order to produce power at frequencies independent of engine rotational speed, the output of generator 26 may be converted to a direct current by a generator-side power inverter 28 and then reconverted to an alternating current by a motor-side power inverter 30. The output of the motor-side power inverter 30 may be connected to an electric motor 32. Electric motor 32 turns a differential 34, which drives a ground engaging traction device 36, such as wheels or tracks, to propel the vehicle over the ground.

A slip control system 40 controls the power output of electric motor 32 in order to produce a desired slip of ground engaging traction device 36 over the ground. Slip control system 40 may conveniently control the power output of electric motor 32 by controlling the current produced by motor-side power inverter 30. Slip control system 40 may control the slip so as to provide a selected tractive efficiency (TE) under the current operating conditions of the self-propelled work machine 20.

Figure 3:
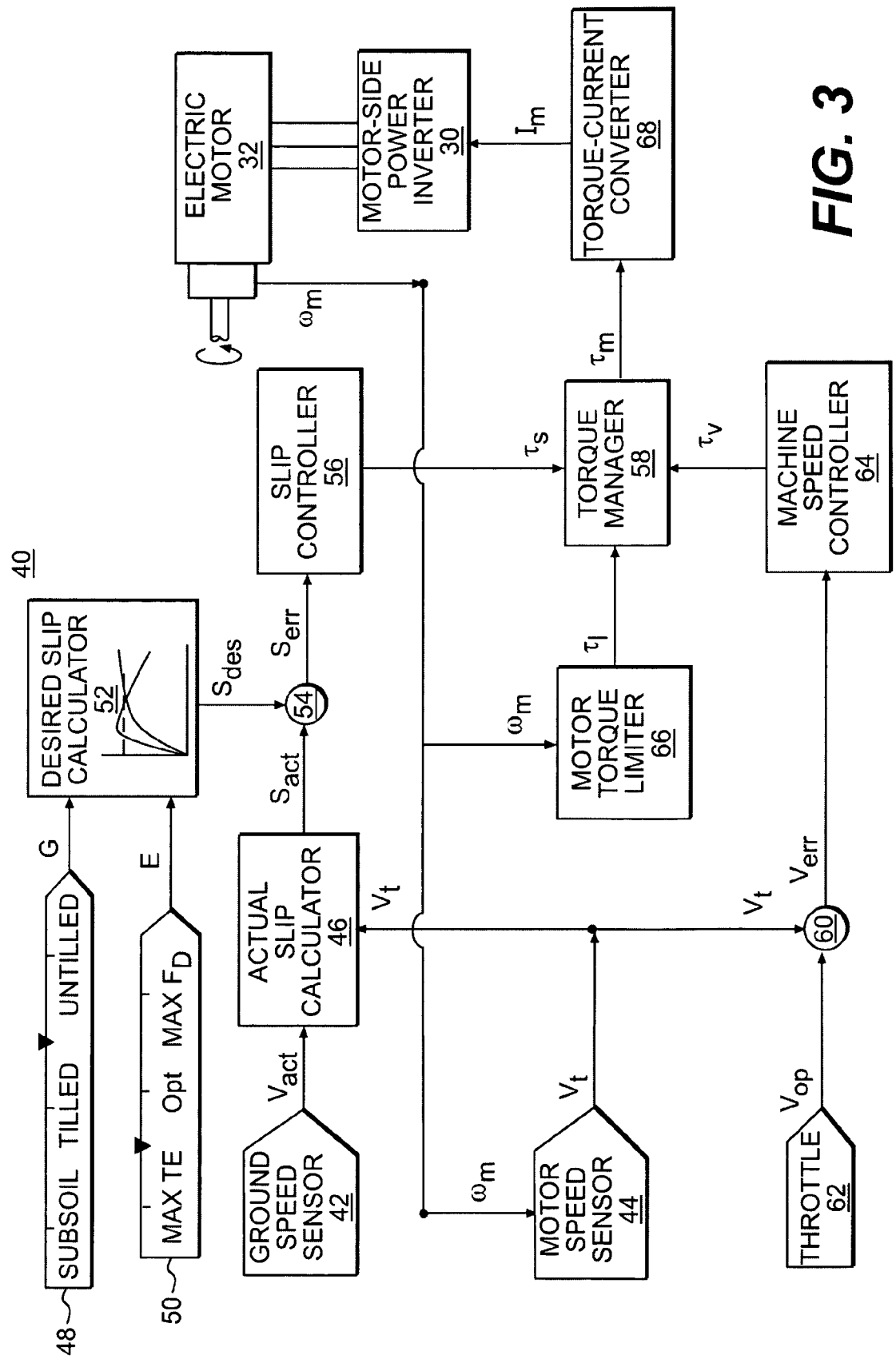
FIG. 3 is a schematic representation of a slip control system according to one exemplary embodiment.

FIG. 3 is a functional block diagram of a slip control system 40 according to one disclosed embodiment of the invention. As shown in FIG. 3, ground speed sensor 42 outputs a signal $V_{act}$ that is indicative of the actual speed of self-propelled machine 20 over the ground. The actual speed may be determined by any of a variety of sensors known to those skilled in the art. For example, the ground speed may be detected using a Doppler radar directed at the ground. A Doppler laser may be used in a similar manner. Alternatively, a non-driven ground-engaging wheel could also be used to sense ground speed. Ground speed could also be determined by measuring the change in position of the tractor over time, e.g., using a Global Positioning System (GPS) receiver.

A motor speed sensor 44 outputs a signal $V_t$ indicative of the theoretical speed of the machine 20. The theoretical speed signal $V_t$ corresponds to the actual speed that would be produced by the ground engaging traction device 36 of the machine 20 at zero slip. The theoretical speed $V_t$ may be calculated as a function of the circumference of the driven wheel or track sprocket, the reduction ratio of the differential, and the sensed rotational speed of the motor ($\omega_m$). However, the theoretical speed $V_t$ may be determined in any other appropriate manner known to those skilled in the art.

An actual slip calculator 46 receives the actual and theoretical speed signals, $V_{act}$ and $V_t$, from sensors 42 and 44, respectively, and outputs a signal $S_{act}$ corresponding to the actual slip experienced by the self-propelled machine 20. $S_{act}$ may be calculated, for example, using Equation 3 above.

In exemplary embodiments, an operator (not shown) of machine 20 may indicate current operating conditions using one or more input devices. The slip control system 40 may then take the particular operating conditions into account when controlling the slip.

A ground condition selector 48 outputs a signal G indicative of a type or condition of the surface on which the machine 20 is operating. The ground condition selector 48 may allow the operator to select between discrete types of ground conditions. For example, the ground condition selector may allow selection between subsoil, tilled earth, or untilled earth, as shown in FIG. 3. Alternatively, the ground condition selector 48 may be a continuum that allows the operator to specify conditions in a range between, e.g., dry and slick conditions. However, the descriptions of the different ground conditions are not intended as limiting, and ground condition selector 48 may provide for selection between more or fewer types of ground conditions. Further, the selectable ground conditions may be indicated in another manner, e.g., by different terms, a scale and/or icons that may be meaningful to an operator trained in the operation of tractor 20.

An efficiency selector 50 outputs a signal E indicative of the operator's preference to maximize tractive efficiency (Max TE) at the expense of drawbar force, or to optimize tractive efficiency and drawbar force (Opt), or, alternatively, to maximize drawbar force (Max FD) regardless of the effect on the machine's operating efficiency. Optimum tractive efficiency may be defined, for example, as the point 51 (see FIG. 1) where the tractive efficiency curve 12 crosses the slip curve 14 for the particular machine 20 under the selected ground conditions. Although efficiency selector 50 is illustrated as providing a choice between discrete efficiency ratings, the efficiency selector 50 may, instead, allow the operator to select a particular efficiency rating along a continuum between maximum tractive efficiency and maximum drawbar force. Further, the selectable efficiency ratings may be indicated in another manner, e.g., by different terms, a scale and/or icons that may be meaningful to a trained operator.

Selectors 48 and 50 may be implemented using any of a variety of appropriate input devices known to those skilled in the art. For example, selectors 48 and 50 may be implemented using switches, dials, buttons, a touch screen, etc. Selectors 48 and 50 may each have a default setting that indicates the selections that are considered most useful in normal operations. Alternatively, one or both selectors 48 and 50 may be omitted and signals G and/or E may be fixed, e.g., hardwired or otherwise set to a predetermined value.

Signals G and/or E from selectors 48 and 50 may be input to a desired slip calculator 52. The desired slip calculator 52 indicates a desired slip signal $S_{des}$ based upon the settings of selectors 48 and/or 50. The desired slip calculator 52 may include a map or formulae that defines the relationship between slip and tractive efficiency and/or slip and drawbar force for a particular tractor configuration over a variety of ground conditions. For example, the desired slip calculator 52 may contain data or formulae defining the tractive efficiency curve 12 and slip curve 14 for the range of ground conditions selectable with ground condition selector 48. The desired slip calculator 52 for a particular tractor configuration may be developed empirically by testing the particular tractor configuration under different ground conditions. Alternatively, the desired slip calculator 52 may be developed by modeling the performance of the particular tractor configuration using computer simulation techniques, or by a combination of empirical testing and simulation.

The desired slip signal $S_{des}$ corresponds to the slip necessary to achieve the tractive efficiency indicated by selector 50, under the ground conditions indicated by selector 48. The desired slip signal $S_{des}$ thus indicates an optimum slip for the given ground conditions and tractive efficiency. For example, using the exemplary tractive efficiency and slip curves of FIG. 1 as representative of the performance of the particular self-propelled machine 20 under the ground conditions selected on selector 48, $S_{des}$ would correspond to a slip of approximately 0.075 if maximum tractive efficiency were selected on selector 50, approximately 0.40 if maximum drawbar pull were selected, and approximately 0.25 if optimal tractive efficiency were selected.

The actual slip signal, $S_{act}$, from the actual slip calculator 46 and the desired slip signal, $S_{des}$, from the desired slip calculator 52 may be input into a first modifier 54. First modifier 54 can determine the difference between these two signals, $S_{act}$ and $S_{des}$, and transmit a slip error signal $S_{err}$ corresponding to the difference.

A slip controller 56 receives the slip error signal $S_{err}$ transmitted by the first modifier 54 and transmits a slip control signal that may be used to control the actual slip $S_{act}$ experienced by the work machine to achieve the desired slip $S_{des}$. For example, slip controller 56 may determine a motor torque necessary to achieve the change in slip indicated by the slip error signal $S_{err}$ and transmit a slip-controlled torque signal TS corresponding to the determined torque. Where the slip error signal $S_{err}$ indicates that the actual slip $S_{act}$ is less than optimal for the given ground conditions and desired tractive efficiency, the slip controller 56 may indicate an increase in torque. Where the slip error signal $S_{err}$ indicates that the actual slip $S_{act}$ is greater than optimal, the slip controller 56 may indicate an decrease in torque. In one embodiment, the slip controller 56 may be a proportional-integral-derivative (PID) controller, although any of a variety of appropriate controllers known to those skilled in the art may also be used.

In order to prevent hunting, i.e., indication of an oscillating torque value, by the slip controller 56, a deadband filter (not shown) may be imposed between first modifier 54 and slip controller 56 to provide hysteresis between positive and negative torque corrections. The deadband filter may be configured to transmit the slip error signal $S_{err}$ only when it has a magnitude greater than a predetermined value. If the magnitude of the slip error signal $S_{err}$ is less than the predetermined value, the deadband filter may transmit a signal having a magnitude of zero. Thus, slip may be controlled to be within a range of the desired slip $S_{des}$.

The slip-controlled torque signal $\tau_s$ may be output to a torque manager 58. The function of the torque manager 58 is discussed below.

In addition to being input into actual slip calculator 46, the theoretical speed output $V_t$ of motor speed sensor 44 may also be input into a second modifier 60. Second modifier 60 additionally receives an operator-commanded speed signal $V_{op}$ from a throttle 62 of the self-propelled machine 20. Second modifier 60 determines the difference between these two signals, $V_{op}$ and $V_t$, and transmits a speed error signal $V_{err}$ corresponding to the difference. Alternatively, the actual machine speed $V_{act}$ may be input into the second modifier instead of the theoretical machine speed $V_t$.

A machine speed controller 64 receives the speed error signal $V_{err}$ transmitted by second modifier 60. Machine speed controller 64 may determine a motor torque necessary to achieve the change in machine speed indicated by the speed error signal $V_{err}$ and transmit a speed-controlled torque signal $\tau_v$ corresponding to the determined torque. In one embodiment, the machine speed controller 64 may be a proportional-integral-derivative (PID) controller. However, any of a variety of other appropriate controllers known to those skilled in the art may also be used. The speed-controlled torque signal $\tau_v$ is sent from the machine speed controller to the torque manager 58.

In addition to receiving the slip-controlled torque signal $\tau_s$ and the speed-controlled torque signal $\tau_v$, torque manager 58 also receives a motor-limited torque signal $\tau_l$ from a motor torque limiter 66. The motor-limited torque signal $\tau_l$ can be used to prevent requests for torque that are outside the operating parameters of electric drive system 22. For example, motor torque limiter 66 may indicate a maximum and/or minimum torque that may be produced by electric drive system 22 without adverse effect on machine operation and/or damage to machine 20. Motor torque limiter 66 may modify the motor-limited torque signal $\tau_l$ based upon inputs from various sensors (not shown). For example, motor torque limiter 66 may modify the motor-limited torque signal $\tau_l$ based upon the rotational speed $\omega_m$ of the motor 32 or other components (engine 24, generator 26, pumps, etc.) in order to prevent either an underspeed condition or an overspeed condition. The motor torque limiter 66 may also modify the motor-limited torque signal $\tau_l$ based upon the thermal conditions of various components and/or fluids of electric drive system 22.

Torque manager 58 may receive slip-controlled torque signal $\tau_s$ from slip controller 56, the speed-controlled torque signal $\tau_v$ from speed controller 64, and the motor-limited torque signal $\tau_l$ from motor torque limiter 66 and output a final motor torque signal $\tau_m$ based upon the signals $\tau_s$, $\tau_v$ and $\tau_l$. The final motor torque signal $\tau_m$ may correspond to the lowest of the torques indicated by the signals $\tau_s$, $\tau_v$ and $\tau_l$.

For example, where the torque indicated by speed-controlled torque signal $\tau_v$ is less than the torque indicated by slip-controlled torque signal $\tau_s$ and is also less than the torque indicated by motor-limited torque signal $\tau_l$, the final motor torque signal may indicate a torque corresponding to the torque indicated by speed-controlled torque signal $\tau_v$ so as to produce the operator's desired speed. Where the torque indicated by slip-controlled torque signal $\tau_s$ is less than the torque indicated by speed-controlled torque signal $\tau_v$, and the torque indicated by motor-limited torque signal $\tau_l$, the final motor torque signal may indicate a torque corresponding to the torque indicated by slip-controlled torque signal $\tau_s$ to meet the operator's desired tractive efficiency. And where the torque indicated by motor-limited torque signal $\tau_l$ is less than the torque indicated by slip-controlled torque signal $\tau_s$, and the torque indicated by speed-controlled torque signal $\tau_v$, the final motor torque signal may indicate a torque corresponding to the torque indicated by motor-limited torque signal $\tau_l$ to avoid damage to the components of electric drive system 22.

The final motor torque signal $\tau_m$ may be sent to a torque-current converter 68. Torque-current converter 68 may include a map or formula that defines the relationship between input current and output torque for motor 32. From this relationship, torque-current converter 68 may determine a motor control current corresponding to the final motor torque signal $\tau_m$. The torque-current relationship for the particular motor 32 may be linear or nonlinear and may be determined empirically or by modeling.

Torque-current converter 68 may control the power output of the motor by providing a motor control current signal $I_m$ to motor-side power inverter 30 corresponding to the determined motor control current In response, motor-side power inverter 30 provides the indicated current to the motor 32 which then produces a motor speed $\omega_m$ corresponding to the motor control current $I_m$, and thus a motor torque corresponding to the final motor torque signal $\tau_m$.

A signal $\omega_m$ corresponding to the motor rotational speed may then be fed back to the motor speed sensor 44. As a result, slip control system 40 may provide closed-loop control of slip, machine speed and tractive efficiency.

INDUSTRIAL APPLICABILITY

The slip control system of the present disclosure may be applied to a variety of self-propelled work machines, including those with electric drive propulsion systems or conventional drive systems. By providing for the direct control of the torque of an electric motor, the slip control system of the present disclosure allows the control of slip in work machines having electric drive propulsion systems. In operation, the slip control system of the present disclosure provides for the optimization of wheel or track slip according to the current ground conditions and/or the operator's desired tractive efficiency. By providing such optimization, the slip control system of the present disclosure may allow self-propelled work machines, such as tractors, to be operated more efficiently in various types of operating conditions. Thus, the slip control system of the present disclosure overcomes the deficiencies of prior art slip control systems, such as the system disclosed in the '280 patent.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A system for controlling slip of a ground-engaging traction device of a work machine, comprising:
    an actual slip calculator operable to transmit an actual slip signal corresponding to an actual slip experienced by the work machine;
    a ground condition selector operable to transmit a ground condition signal corresponding to a selected ground condition;
    a desired slip calculator operable to transmit a desired slip signal based on the ground condition signal; and
    a slip controller coupled with the actual slip calculator and the desired slip calculator, the slip controller operable to transmit a slip control signal based on the actual slip signal and the desired slip signal, wherein the slip control signal controls the actual slip experienced by the work machine to achieve the desired slip.

2. The system of claim 1, wherein the desired slip calculator includes data that define a relationship between slip and ground condition for a particular work machine configuration.

3. The system of claim 1, further including a tractive efficiency selector operable to transmit a tractive efficiency signal corresponding to a selected tractive efficiency, and wherein the desired slip calculator is further operable to transmit the desired slip signal based on the tractive efficiency signal.

4. The system of claim 3, wherein the desired slip calculator includes data that define a relationship between slip and tractive efficiency for a particular work machine configuration.

5. The system of claim 1, wherein the slip control signal includes a slip-controlled torque signal operable to control a torque of a propulsion system of the work machine.

6. The system of claim 5, further including a torque manager operable to transmit a propulsion system torque signal based on the slip-controlled torque signal, the propulsion system torque signal operable to control a torque of the propulsion system.

7. A system for controlling slip of a ground-engaging traction device of a work machine, comprising:
    an actual slip calculator operable to transmit an actual slip signal corresponding to an actual slip experienced by the work machine;
    a tractive efficiency selector operable to transmit a tractive efficiency signal corresponding to a selected tractive efficiency;
    a desired slip calculator operable to transmit a desired slip signal based on the tractive efficiency signal; and
    a slip controller coupled with the actual slip calculator and the desired slip calculator, the slip controller operable to transmit a slip control signal based on the actual slip signal and the desired slip signal, wherein the slip control signal controls the actual slip experienced by the work machine to achieve the desired slip.

8. The system of claim 7, wherein the desired slip calculator includes data that define a relationship between slip and tractive efficiency for a particular work machine configuration.

9. The system of claim 7, wherein the slip control signal includes a slip-controlled torque signal to control a torque of a propulsion system of the work machine.

10. The system of claim 9, further including a torque manager operable to transmit a propulsion system torque signal based on the slip-controlled torque signal, the propulsion system torque signal controlling a torque of the propulsion system.

11. A method for controlling slip of a ground-engaging traction device of a work machine, comprising:

determining an actual slip experienced by the work machine;

receiving a ground condition signal corresponding to a selected ground condition;

determining a desired slip based on the ground condition signal; and controlling the actual slip experienced by the work machine to achieve the desired slip.

12. The method of claim 11, wherein determining a desired slip includes defining a relationship between slip and ground condition for a particular work machine configuration.

13. The method claim 11, further including receiving a tractive efficiency signal corresponding to a selected tractive efficiency, and wherein determining a desired slip further includes determining the desired slip based on the tractive efficiency signal.

14. The method of claim 13, wherein determining a desired slip based on the tractive efficiency signal includes defining a relationship between slip and tractive efficiency for a particular work machine configuration.

15. The method of claim 11, wherein controlling an actual slip experienced by the work machine includes controlling a torque of a propulsion system of the work machine.

16. A method for controlling slip of a ground-engaging traction device of a work machine, comprising:

determining an actual slip experienced by the work machine;

receiving a tractive efficiency signal corresponding to a selected tractive efficiency;

determining a desired slip based on the tractive efficiency signal; and controlling the actual slip experienced by the work machine to achieve the desired slip.

17. The method of claim 16, wherein determining a desired slip includes defining a relationship between slip and tractive efficiency for a particular work machine configuration.

18. The method of claim 16, wherein controlling an actual slip experienced by the work machine includes controlling a torque of a propulsion system of the work machine.

19. A work machine, comprising:

a propulsion system;

an actual slip calculator operable to transmit an actual slip signal corresponding to an actual slip experienced by the work machine;

a ground condition selector operable to transmit a ground condition signal corresponding to a selected ground condition;

a desired slip calculator operable to transmit a desired slip signal based on the ground condition signal; and a slip controller coupled with the actual slip calculator and the desired slip calculator, the slip controller operable to transmit a slip control signal based on the actual slip signal and the desired slip signal, wherein a power output of the propulsion system is varied based on the slip control signal to control the actual slip experienced by the work machine to achieve the desired slip.

20. The work machine of claim 19, wherein the desired slip calculator includes data that define a relationship between slip and ground condition for a particular work machine configuration.

21. The work machine of claim 19, further including a tractive efficiency selector operable to transmit a tractive efficiency signal corresponding to a selected tractive efficiency, and wherein the desired slip calculator is further operable to transmit the desired slip signal based on the tractive efficiency signal.

22. The work machine of claim 21, wherein the desired slip calculator includes data that define a relationship between slip and tractive efficiency for a particular work machine configuration.

23. The work machine of claim 19, wherein the slip control signal includes a slip-controlled torque signal to control a torque of the propulsion system.

24. The work machine of claim 23, further including a torque manager operable to transmit a propulsion system torque signal based on the slip-controlled torque signal, the propulsion system torque signal controlling a torque of the propulsion system.

25. A work machine, comprising:

a propulsion system;

an actual slip calculator operable to transmit an actual slip signal corresponding to an actual slip experienced by the work machine;

a tractive efficiency selector operable to transmit a tractive efficiency signal corresponding to a tractive efficiency selected by an operator of the work machine;

a desired slip calculator operable to transmit a desired slip signal based on the tractive efficiency signal; and a slip controller coupled with the actual slip calculator and the desired slip calculator, the slip controller operable to transmit a slip control signal based on the actual slip signal and the desired slip signal, wherein a power output of the propulsion system is varied based on the slip control signal to control the actual slip experienced by the work machine to achieve the desired slip.

26. The work machine of claim 25, wherein the desired slip calculator includes data that define a relationship between slip and tractive efficiency for a particular work machine configuration.

27. The work machine of claim 25, wherein the slip control signal includes a slip-controlled torque signal to control a torque of a propulsion system of the work machine.

28. The work machine of claim 27, further including a torque manager operable to transmit a propulsion system torque signal based on the slip-controlled torque signal, the propulsion system torque signal controlling a torque of the propulsion system.

29. A work machine, comprising:

an electric drive propulsion system;

an actual slip calculator operable to transmit an actual slip signal corresponding to an actual slip experienced by the work machine;

a desired slip calculator operable to transmit a desired slip signal based on at least one operational input parameter; and a slip controller coupled with the actual slip calculator and the desired slip calculator, the slip controller operable to transmit a slip control signal based on the actual slip signal and the desired slip signal, wherein a torque output of the electric drive propulsion system is varied based on the slip control signal to control the actual slip experienced by the work machine to achieve the desired slip.

30. The work machine of claim 29, wherein the operational input parameter includes at least one of a ground condition signal corresponding to a selected ground condition and a tractive efficiency signal corresponding to a selected tractive efficiency.

* * * * *

UNITED STATES PATENT AND TRADEMARK OFFICE
CERTIFICATE OF CORRECTION

PATENT NO. : 7,337,054 B2 Page 1 of 1
APPLICATION NO. : 10/901349
DATED : February 26, 2008
INVENTOR(S) : Pandey et al.

It is certified that error appears in the above-identified patent and that said Letters Patent is hereby corrected as shown below:

Please correct the Specification as follows:

Column 5, line 57, delete "TS" and insert -- $\tau_S$ --.

Signed and Sealed this

Twenty-first Day of October, 2008

JON W. DUDAS
*Director of the United States Patent and Trademark Office*